Patented Sept. 4, 1928.

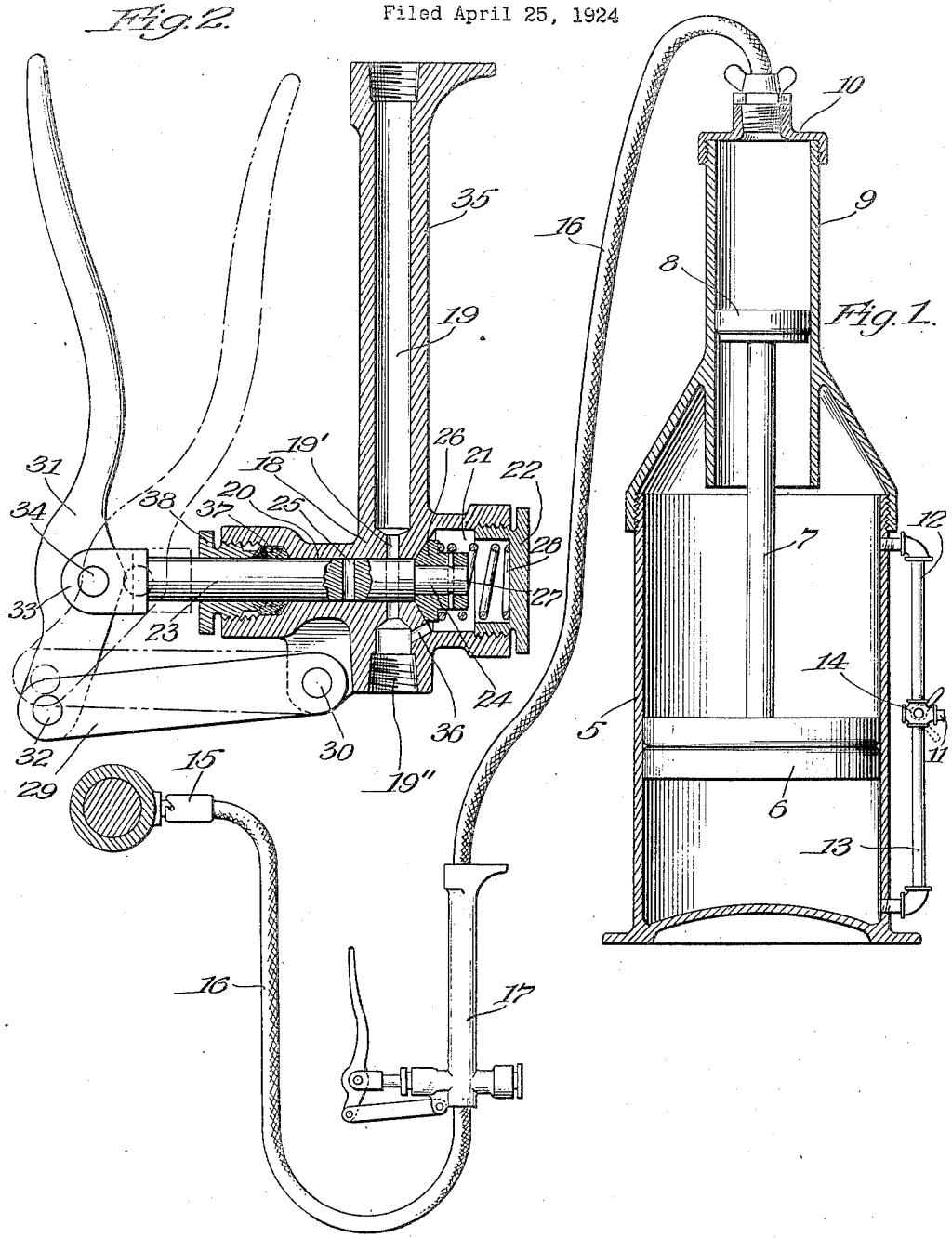

1,682,891

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

VALVE.

Application filed April 25, 1924. Serial No. 708,931.

My invention relates to improvements in valves, and is particularly concerned with the provision of a novel type of valve adapted to form part of a lubricant compressor for supplying lubricant under pressure to the various fittings secured to the bearings of a mechanism to be lubricated.

It is now common practice to provide mechanisms of various kinds with a plurality of fittings, one of which is secured to each of the bearings of the mechanism to be lubricated, and to supply lubricant to these fittings by means of a power operated compressor, which embodies, among other things a flexible conduit for conducting the lubricant to the bearings, this conduit being provided at its free end with a coupling member for successively making sealed contact or connection with the various fittings. It is desirable to provide means for controlling the flow of lubricant through such flexible conduit, and where the coupling for securing or connecting the conduit with the fittings comprises means for making mechanical connection with the fittings, it is also desirable to reduce the pressure of the lubricant in the coupling so as to permit the latter to be detached from one fitting and attached to another fitting.

One of the objects of my invention is to provide a valve construction suitable for the purpose described above.

Another object of my invention is to provide a valve, such as described, which is simple in construction, economical to manufacture, and easy to operate.

Other objects of my invention will appear as this description progresses, reference being had to the accompanying drawings, in which Figure 1 is a view, partially in longitudinal section and partially in elevation, disclosing my improved valve embodied in a lubricating system, such as described, and Figure 2 is a longitudinal section, partially in side elevation, showing the details of construction of my improved valve.

Referring to the drawings, I have illustrated my improved valve construction in combination with a lubricant compressor comprising the barrel 5, in which is reciprocably mounted the piston 6. This piston is connected, by means of the piston rod 7, with the piston 8, of considerably smaller diameter. This piston is reciprocably mounted in the cylinder 9 having the cap 10 which can be removed for filling the cylinder 9 with lubricant.

A pipe 11, which may be connected with any suitable supply of fluid under pressure, is connected with the two pipes 12 and 13 leading to opposite ends of the cylinder 5 by means of the four way valve 14. This valve is of such construction that fluid under pressure can be admitted to either end of the cylinder 5, and the opposite end vented to atmosphere. Such valves are of well-known construction, and further description thereof is, for that reason, unnecessary. By shifting this valve to one position, air or other fluid can be admitted to the lower end of the cylinder 5, which, therefore, tends to move upwardly under the pressure of the air, and thus causes the piston 8 in the cylinder 9 to place the contents of this cylinder under pressure.

The lubricant is conducted from the cylinder 9 to the coupling member 15 by means of the flexible conduit 16, in which is inserted my improved valve 17.

This valve comprises the body member 18 having the lubricant conducting bore 19 extending longitudinally thereof, and the intersecting bore 20. At the point where these two bores cross each other, the diameter of the bore 19 is reduced, as shown at 19'.

One end of the bore 20 is enlarged to form a chamber 21, which is closed by means of the threaded plug 22. A plunger 23 is reciprocably mounted in the bore 20, and its inner reduced end portion 24 extends into the chamber 21. Intermediate its ends, the plunger 23 is provided with a transverse passageway 25, which can be brought into registry with the reduced portion 19' of the bore 19 so as to permit lubricant to flow through the conduit 16 under the pressure generated in the compressor described above.

A collar or stop member 26 is secured to the reduced portion 24 of the plunger 23 by means of the cross pin 27, and a spring 28, confined between the plug 22 and the collar 26, provides means for yieldingly holding the plunger 23 in the position shown in Figure 2, in which it prevents the flow of lubricant through the conduit 16.

The means which I have provided for moving the plunger 23 to the position in which its passageway 25 and the reduced portion 19' of the bore 19 register comprises the link 29, which is pivotally secured to the body member, as shown at 30, and to the opposite end of which is pivotally secured the lever or handle 31, the connection between these two elements being provided by the pivot pin 32. The outer end of the plunger 23 terminates in a pair of spaced lugs 33, only one of which is shown, which is pivotally secured to an intermediate portion of the handle 31 by means of the pin 34. The handle 31 extends substantially parallel with the portion 35 of the body member, so that the operator can grasp the handle 31 and the portion 35 of the body member with one hand, and, by contracting the fingers, cause the handle 31 to move toward the portion 35 of the body member. When the handle 31 is in the position shown in dotted outline, the two passageways 25 and 19' are in registry, and lubricant can pass through the discharge conduit 16 to the coupling member 15. When the operator releases his grasp upon the handle 31, the spring 28 will return the plunger to the position shown in Figure 2, thereby stopping the flow of lubricant through the discharge conduit 16.

As the plunger or valve member 23 returns to the position shown in Figure 2, a portion of this plunger will be withdrawn from the chamber 21, and to that extent will increase the capacity of this chamber and tend to form a vacuum therein. The chamber 21 is connected with that portion 19'' of the bore 19 which is connected with the coupling 15 by means of the passageway 36, and when this partial vacuum is formed in the chamber 21, the pressure on the lubricant in that portion of the conduit 16 between the valve 17 and the coupling member 15 will be reduced, and a portion of the lubricant therein will be drawn into the chamber 21. The coupling member 15 can then be detached from the fitting to which it is secured, and applied to the next fitting. Thereupon, the operator moves the handle 31 toward the portion 35 of the valve. This causes the inner end of the plunger 23 to move into the chamber 21 and displace therefrom, through the opening 36 and into the outer end portion of the conduit 16, any lubricant that may have been sucked into the chamber 21 by the previous operation.

If desired, a packing 37 and a gland or follower 38 may be used for preventing the leakage of lubricant along the plunger 23.

It should be noted that there is no pressure exerted upon the plunger or valve member 23 by the lubricant which tends to prevent the opening of the passageway between the two portions of the conduit 16 so that I have provided a valve construction which is easy to move to its open position because it is partly balanced. The spring 28 need only be of slightly greater strength than that required to enable the operator to pick up and handle the device without inadvertently opening the valve, the excess strength being available to relieve the pressure on the discharge side after the valve is closed. When the lubricant passes through the passageway 25, under the pressure generated in the compressor described above, a portion of it will of course, be forced through the opening 36 into the chamber 21, and be exerted upon the inner end of the plunger 23, but when the plunger is in this position, the pivot 32 is so close to the pivot 34 that the operator can hold the valve in its open position without much effort. This increase in pressure on the handle is a distinct aid to the operator, as he can "feel" the discharge of lubricant when it begins instead of waiting to see old lubricant oozing from the parts being lubricated before he knows what has happened. If, for any reason, there should be any undesirable fluctuation in the pressure of the supply, the operator's hand holding the lever will instantly tell him, and if the pressure is low he will hold the valve open longer.

While I have described the details of construction of the preferred embodiment of m invention, it is to be clearly understood tha my invention is not limited to these detail but is capable of other adaptations an modifications within the scope of the ap pended claims.

Having thus described my invention, wha I claim is:

1. A valve for lubricant compressors con prising a cross-shaped body member havin intersecting bores, one end of one of sai bores being enlarged to form a chambe means for establishing communication be tween said chamber and the other bore, plunger reciprocable in the chambered bor and having a transverse passageway for con municating with the other bore, said plung extending into said chamber and provide with a stop member for engaging one wall o said chamber, a spring in said chamber fo moving said plunger in one direction, and handle, pivotally mounted on said bod member, for moving said plunger in th other direction.

2. A valve for lubricant compressors con prising a cross-shaped body member havin intersecting bores, one end of one of sa bores being enlarged to form a chambe means for establishing communication b tween said chamber and the other bore, plunger reciprocable in the chambered bo and having a passageway for communicati with the other bore, said plunger extendi into said chamber, a spring for moving sa plunger in one direction, and a handle f moving said plunger in the other directic 3. A valve for lubricant compressors co prising a body member having a longitudinally extending bore, a chamber communicating with the discharge portion of said bore, a second bore intersecting said first named bore, a plunger reciprocable in said second bore and having a passageway for establishing communication between the two portions of said first named bore, said plunger having a portion for extension into said chamber, and means whereby said plunger can be reciprocated, said portion varying with different positions of said plunger and being least when said plunger is in a position corresponding to the fully closed position of said valve, whereby a partial vacuum is formed in said chamber as said valve is moved to its closed position.

4. A valve for a lubricant compressor comprising a body member having a lubricant conducting bore forming inlet and outlet passages, a second bore intersecting said conducting bore and terminating in a chamber which communicates with said conducting bore, and a valve unaffected by fluid pressure in the inlet reciprocable in said second bore and having a portion movable into and out of said chamber.

5. A valve comprising a body member having a lubricant conducting bore therethrough, and a valve member for controlling the flow of lubricant through said bore, said valve member and body member having coacting means for relieving the pressure in a portion of said bore when said valve is moving to its closed position.

6. A valve comprising a body having a lubricant inlet and an outlet, and a manually operable valve in said body, said valve being unaffected by the lubricant pressure in the inlet and having means adapted to be affected by the lubricant pressure in the outlet tending to move it from open to closed position.

7. A valve comprising a body having a lubricant inlet and an outlet, a manually operable valve member in said body unaffected by the inlet pressure, means adapted to be actuated by the pressure in the outlet so as to tend to close the valve, said means operating to enlarge the volume of the outlet space, and spring means for assisting in the actuation of said means.

8. A valve comprising a body having a lubricant inlet and an outlet, a manually operable valve member in said body unaffected by the inlet pressure, means adapted to be actuated by the pressure in the outlet so as to tend to close the valve, said means operating to enlarge the volume of the outlet space, spring means for assisting in the actuation of said means, and a stop limiting the movement of said valve.

In witness whereof, I hereunto subscribe my name this 21st day of April, 1924.

ERNEST W. DAVIS.